(12) United States Patent
Yano et al.

(10) Patent No.: US 9,327,426 B2
(45) Date of Patent: May 3, 2016

(54) MOLDING MATERIAL AND MANUFACTURING METHOD THEREFOR

(75) Inventors: Hiroyuki Yano, Uji (JP); Tadafumi Hashimoto, Uji (JP); Akihiro Sato, Uji (JP); Antonio Norio Nakagaito, Uji (JP)

(73) Assignees: NIPPON PAPER INDUSTRIES CO., LTD., Tokyo (JP); Oji Holdings Corporation, Tokyo (JP); Kyoto University, Kyoto-shi (JP)

(*) Notice: Subject to any disclaimer, the term of this patent is extended or adjusted under 35 U.S.C. 154(b) by 18 days.

(21) Appl. No.: 13/635,785

(22) PCT Filed: Mar. 16, 2011

(86) PCT No.: PCT/JP2011/056166
§ 371 (c)(1),
(2), (4) Date: Sep. 18, 2012

(87) PCT Pub. No.: WO2011/115154
PCT Pub. Date: Sep. 22, 2011

(65) Prior Publication Data
US 2013/0005866 A1    Jan. 3, 2013

(30) Foreign Application Priority Data
Mar. 19, 2010    (JP) .................................. 2010-065023

(51) Int. Cl.
*C08L 67/02*    (2006.01)
*C08L 97/02*    (2006.01)
(Continued)

(52) U.S. Cl.
CPC    *B29B 15/08* (2013.01); *C08H 8/00* (2013.01); *C08L 1/02* (2013.01); *C08L 67/06* (2013.01);
(Continued)

(58) Field of Classification Search
CPC ...... C08H 8/00; C08L 1/286; D10B 2201/28; C08B 11/12

USPC .......................... 536/43, 44; 524/45
See application file for complete search history.

(56) References Cited

U.S. PATENT DOCUMENTS 3,244,664 A    4/1966  Zelinski et al.
4,405,324 A *  9/1983  Cruz, Jr. ........................ 604/376
(Continued)

FOREIGN PATENT DOCUMENTS

CN        1832985 A     9/2006
CN      101490090 A     7/2009
(Continued)

OTHER PUBLICATIONS

Hanna et al., Journal of Polymer Science: Polymer Chemistry Edition, vol. 18, 1425-1429 (1980).*
(Continued)

*Primary Examiner* — Liam J Heincer
(74) *Attorney, Agent, or Firm* — Locke Lord LLP; James E. Armstrong, IV; Nicholas J. DiCeglie, Jr.

(57) ABSTRACT

The present invention relates to anionically modified microfibrillated plant fibers used for obtaining a thermosetting resin molding material having excellent mechanical strength, a method for manufacturing the same, a molding material containing the anionically modified microfibrillated plant fibers and a thermosetting resin, and a method for manufacturing the same. Specifically, the present invention provides a molding material containing anionically modified microfibrillated plant fibers that are anionically modified in the presence of a base by a carboxylic acid represented by formula (I): $X-(CH_2)_n-COOH$ (I), wherein X represents halogen and n is 1 or 2, and/or by a salt thereof, and a thermosetting resin, and the molding material contains the anionically modified microfibrillated plant fibers in an amount of 10 to 900 parts by weight per 100 parts by weight of the thermosetting resin.

6 Claims, 2 Drawing Sheets

US 9,327,426 B2

Page 2

(51) Int. Cl.
*B29B 15/08* (2006.01)
*C08L 1/02* (2006.01)
*C08L 99/00* (2006.01)
*C08L 101/00* (2006.01)
*C08H 8/00* (2010.01)
*C08L 67/06* (2006.01)
*B29K 311/10* (2006.01)
*B29K 101/10* (2006.01)
*D21H 11/12* (2006.01)
*D21H 11/18* (2006.01)
*D21H 11/20* (2006.01)

(52) U.S. Cl.
CPC .............. *C08L 97/02* (2013.01); *C08L 99/00* (2013.01); *C08L 101/00* (2013.01); *B29K 2101/10* (2013.01); *B29K 2311/10* (2013.01); *C08L 2205/16* (2013.01); *D21H 11/12* (2013.01); *D21H 11/18* (2013.01); *D21H 11/20* (2013.01)

(56) References Cited

U.S. PATENT DOCUMENTS

| | | | |
|---|---|---|---|
| 6,124,058 A * | 9/2000 | Ohmory et al. | 429/247 |
| 6,348,436 B1 * | 2/2002 | Langlois et al. | 507/112 |
| 6,602,994 B1 * | 8/2003 | Cash et al. | 536/30 |
| 7,541,396 B2 * | 6/2009 | Luo et al. | 524/45 |
| 8,030,375 B2 * | 10/2011 | Yano et al. | 523/200 |
| 2001/0020520 A1 | 9/2001 | Hu et al. | |
| 2002/0061335 A1 * | 5/2002 | Kumar | 424/488 |
| 2005/0067730 A1 | 3/2005 | Yano et al. | |
| 2006/0182941 A1 | 8/2006 | Yano et al. | |
| 2007/0224419 A1 * | 9/2007 | Sumnicht et al. | 428/364 |
| 2009/0054552 A1 * | 2/2009 | Yano et al. | 523/200 |
| 2009/0298976 A1 * | 12/2009 | Yano et al. | 524/35 |
| 2009/0308552 A1 | 12/2009 | Yano et al. | |
| 2010/0065236 A1 * | 3/2010 | Henriksson et al. | 162/174 |
| 2010/0212850 A1 * | 8/2010 | Sumnicht et al. | 162/111 |
| 2011/0263756 A1 * | 10/2011 | Yano et al. | 524/13 |
| 2012/0043039 A1 * | 2/2012 | Paltakari et al. | 162/157.6 |
| 2012/0277351 A1 * | 11/2012 | Yano et al. | 524/35 |
| 2013/0005869 A1 * | 1/2013 | Yano et al. | 524/43 |
| 2013/0186581 A1 * | 7/2013 | Super et al. | 162/111 |

FOREIGN PATENT DOCUMENTS

| | | |
|---|---|---|
| JP | 10-251301 A | 9/1998 |
| JP | 2003-201695 A | 7/2003 |
| JP | 2005-042283 A | 2/2005 |
| JP | 2005-067064 A | 3/2005 |
| JP | 2007-231438 A | 9/2007 |
| JP | 2008-001728 A | 1/2008 |
| JP | 2008-248092 A | 10/2008 |
| JP | 2008-248093 A | 10/2008 |
| JP | 2008-291105 A | 12/2008 |
| JP | 2008-310309 A | 12/2008 |
| JP | 2008-310310 A | 12/2008 |
| JP | 2009-029927 A | 2/2009 |
| JP | 2009-293167 A | 12/2009 |
| WO | WO 2010013502 A1 * | 2/2010 |

OTHER PUBLICATIONS

International Search Report dated Apr. 12, 2011, issued for PCT/JP2011/056166.
Extended European Search Report issued in corresponding European Patent Application No. EP 11756338.7, dated Sep. 1, 2014.
Third Office Action, issued in corresponding Chinese Patent Application No. CN201180013979.0, dated May 28, 2015.

* cited by examiner

MOLDING MATERIAL AND MANUFACTURING METHOD THEREFOR

TECHNICAL FIELD

The present invention relates to a molding material containing anionically modified microfibrillated plant fibers and a thermosetting resin, and to a method for manufacturing the same.

BACKGROUND ART

Conventionally, to improve the strength and like properties of resin, use of a filler to reinforce resin has been known. In particular, glass fiber is used in various fields because of its excellent mechanical properties. However, although glass fiber has excellent mechanical properties, it has problems in that the resulting molding material becomes heavy due to high relative density, and a large amount of residue is generated at the time of disposal. On the other hand, it has been known that a microfibrillated plant fiber (nanofiber) that is refined to a nano-order fiber diameter size by microfibrillating a cellulose fiber obtained from wood or a herb is lightweight and has high strength. Recently, attempts have been made to obtain a lightweight resin molding material having high strength by using such a microfibrillated plant fiber.

For example, Patent Literature 1 discloses a method in which pulp and/or cellulose-based fiber that has been subjected to a simple pretreatment in which a primary wall outer layer and a secondary wall outer layer are damaged is melted and kneaded with a resin component in the presence of a swelling agent of cellulose amorphous regions to defibrate fiber components during melting and kneading, thereby microfibrilating the fiber components, and uniformly and finely dispersing the fiber components in the resin component.

Patent Literature 2 discloses a material with high strength comprising 65 to 100% by weight (solids content) of a cellulose microfibril and 0 to 35% by weight of an additive. Additionally, as methods for microfibrilating pulp to obtain microfibrils, Patent Literature 2 discloses methods for treating pulp, such as treatment using a medium stirring mill, treatment using a vibration mill, treatment using a high-pressure homogenizer, and treatment using a stone mill. In addition, as additives, Patent Literature 2 discloses thermosetting resins such as phenol resin, urea resin, melamine resin, unsaturated polyester resin, epoxy resin, diallyl phthalate resin, polyurethane resin, silicone resin, and polyimide resin.

Patent Literature 3 discloses conventional fiber reinforcing plastics that use as a reinforcing material, a lignocellulose fiber, in which the cell wall of the fiber is transformed to lose intracellular space, which is a hollow portion.

Patent Literature 4 discloses microfibrillating a cellulose fiber having a specific length using a homogenizer (high-pressure homogenizer, etc.) to obtain a microfibrillated cellulose having excellent water retentivity and long fiber length despite a small fiber diameter. However, Patent Literature 4 relates to a microfibrillated cellulose useful for special paper and filtration material requiring strength, to a method for producing the same, and to a nonwoven sheet comprising the microfibrillated cellulose; Patent Literature 4 does not teach a composite with resin.

In Patent Literature 1 to 4, since microfibrillated plant fibers are obtained by a mechanical treatment such as a treatment using a twin-screw kneader or a stone mill, treatment using a PFI mill, or treatment using a high-pressure homogenizer, a large amount of energy is required to microfibrillate all of the plant fibers, and fiber breakage occurs during the microfibrillation. Therefore, the intrinsic properties of microfibrillated plant fibers have not been fully developed.

By combining a chemical treatment with a mechanical treatment, attempts to perform nanofibrillation have been made while reducing damage such as breakage by not applying an excessive shearing force.

For example, Patent Literature 5 discloses that an oxyl compound such as 2,2,6,6-tetramethyl-1-piperidine-N-oxyl (TEMPO) is reacted with a natural cellulose material using a co-oxidizer to oxidize a part of the $C_6$ primary hydroxyl groups in a cellulose to aldehydes or carboxy groups by using aldehydes, thus obtaining refined cellulose fibers having a number average diameter of 150 nm or less by a relatively light mechanical treatment, i.e., by electrostatic repulsion. Although Patent Literature 5 discloses that the invention can be applied as a nano-filler for a composite material, there is no specific description of forming a composite material with resin. Additionally, Example 1 teaches that the obtained nanofiber dispersion has a content of 0.1% by weight, and is transparent and slightly viscous. Thus, there are various problems such that a large amount of energy is required for dehydration to form a resin composite, and modified aldehyde groups or carboxy groups easily cause heat deterioration of microfibrillated plant fibers in the formation of a thermosetting resin in the resin mixing step.

Further, Patent Literature 6 discloses a method for semi-esterifying some of the hydroxyl groups by a polybasic acid anhydride. In the cellulose in which a part of the hydroxyl groups are semi-esterified by a polybasic acid anhydride, the modified portion has ester bonding; therefore, the modified portion problematically causes a side reaction such as hydrolysis. Thus, when such modified cellulose fibers are used as a resin molding material, further improvement in strength can be expected.

Furthermore, Patent Literature 7 discloses a cellulose derivative whose water retentivity and re-dispersibility in water are improved, by subjecting cellulose fibers to carboxymethyl etherification, and then microfibrillation; however, mechanical pulverization or grinding, which is a method for microfibrillating cellulose fibers, is performed by a dry method or a wet method that uses a non-swelling solvent as a medium. Therefore, although a material having good water retentivity and water dispersibility can be obtained, the cellulose derivative has room for improvement when used as a reinforcer for a resin molding material because of insufficient nanofibrillation of plant fibers.

CITATION LIST

Patent Literature

PTL 1: Japanese Unexamined Patent Publication No. 2005-042283
PTL 2: Japanese Unexamined Patent Publication No. 2003-201695
PTL 3: Japanese Unexamined Patent Publication No. 2005-067064
PTL 4: Japanese Unexamined Patent Publication No. 2007-231438
PTL 5: Japanese Unexamined Patent Publication No. 2008-1728
PTL 6: Japanese Unexamined Patent Publication No. 2009-293167

PTL 7: Japanese Unexamined Patent Publication No. H10-251301

SUMMARY OF INVENTION

Technical Problem

The present invention relates to anionically modified microfibrillated plant fibers used for obtaining a thermosetting resin molding material having excellent mechanical strength, a method for manufacturing the same, a molding material containing the anionically modified microfibrillated plant fibers and a thermosetting resin, and a method for manufacturing the same.

Solution to Problem

As described above, in producing microfibrillated plant fibers from plant fibers such as wood pulp, modifying a starting material or a defibration method to enhance nanofibrillation and subjecting raw material fibers to a chemical treatment to improve water retentivity have been known. However, fibers that are highly refined even to microfibrillated plant fibers have different levels of fiber dispersibility and surface damage depending on the defibration method or chemical treatment method, and this leads to a great difference in the properties, e.g., strength of a molding product when the microfibrillated plant fibers are used as a reinforcer in a resin molding material. The present inventors found that microfibrillated plant fibers can be easily obtained from a plant-fiber-containing material, and that a resin molding material containing the obtained microfibrillated plant fibers has excellent strength.

The present invention was accomplished as a result of further research based on these findings. Specifically, the present invention provides microfibrillated plant fibers for a thermosetting resin molding material, a method for producing the microfibrillated plant fibers, a molding material containing the plant fibers and a thermosetting resin, and a method for producing the molding material, as shown in Items 1 to 15 below.

1. A molding material comprising anionically modified microfibrillated plant fibers and a thermosetting resin, the anionically modified microfibrillated plant fibers being microfibrillated plant fibers that are anionically modified with a carboxylic acid represented by formula (I):

X—(CH$_2$)$_n$—COOH         (I)

wherein X represents halogen and n is 1 or 2, and/or with a salt thereof, in the presence of a base,
the molding material comprising the anionically modified microfibrillated plant fibers in an amount of 10 to 900 parts by weight per 100 parts by weight of the thermosetting resin.

2. The molding material according to Item 1, wherein the anionically modified microfibrillated plant fibers are obtained by reacting a part of hydroxyl groups of anhydrous glucose units with a carboxylic acid represented by formula (I):

X—(CH$_2$)$_n$—COOH         (I)

wherein X and n are the same as above, in the presence of a base, to convert the hydroxyl groups into a group represented by formula (II):

—O—(CH$_2$)$_n$—COOR         (II)

wherein R represents an alkali metal.

3. The molding material according to Item 1 or 2, wherein the anionically modified microfibrillated plant fibers are microfibrillated plant fibers having a carboxyalkyl group.

4. The molding material according to Item 3, wherein the carboxyalkyl group is a carboxymethyl group.

5. The molding material according to any one of Items 1 to 4 obtained by impregnating an anionically modified microfibrillated plant fiber sheet with a thermosetting resin.

6. The molding material according to any one of Items 1 to 5, wherein the thermosetting resin is an unsaturated polyester resin.

7. The molding material according to any one of Items 1 to 6, wherein a degree of substitution by a carboxylic acid represented by formula (I):

X—(CH$_2$)$_n$—COOH         (I)

wherein X and n are the same as above, and/or by a salt thereof, is not less than 0.01 to less than 0.4 per anhydrous glucose unit in the anionically modified microfibrillated plant fibers.

8. A method for manufacturing the molding material of any one of Items 1 to 7, comprising the steps of:
(1) reacting plant fibers with a carboxylic acid represented by formula (I):

X—(CH$_2$)$_n$—COOH         (I)

wherein X and n are the same as above, and/or with a salt thereof, in the presence of a base, to anionically modify the plant fibers,
(2) defibrating the anionically modified plant fibers obtained in step (1) in the presence of water, and
(3) mixing the anionically modified microfibrillated plant fibers obtained in step (2) with a thermosetting resin.

9. The method according to Item 8, wherein step (3) is a step in which the anionically modified microfibrillated plant fibers obtained in step (2) are formed into a sheet, and the sheet formed is impregnated with a thermosetting resin.

10. The method according to Item 8 or 9, wherein defibration in step (2) is a mechanical defibration treatment.

11. An anionically modified microfibrillated plant fiber for a thermosetting resin molding material, the anionically modified microfibrillated plant fiber being obtained by anionically modifying a plant fiber with a carboxylic acid represented by formula (I):

X—(CH$_2$)$_n$—COOH         (I)

wherein X and n are the same as above, and/or with a salt thereof, in the presence of a base.

12. The anionically modified microfibrillated plant fiber for a thermosetting resin molding material according to Item 11, wherein a degree of substitution by a carboxylic acid represented by formula (I):

X—(CH$_2$)$_n$—COOH         (I)

wherein X and n are the same as above, and/or by a salt thereof, is not less than 0.01 to less than 0.4 per anhydrous glucose unit in the anionically modified microfibrillated plant fiber.

13. The anionically modified microfibrillated plant fiber for a thermosetting resin molding material according to Item 11 or 12, wherein the anionically modified microfibrillated plant fiber is in a sheet form.

14. A method for manufacturing the anionically modified microfibrillated plant fiber for a thermosetting resin molding material of any one of Items 11 to 13, comprising the steps of:

(1) reacting a plant fiber with a carboxylic acid represented by formula (I):

wherein X and n are the same as above, and/or with a salt thereof, in the presence of a base, to anionically modify the plant fiber, and (2) defibrating the anionically modified plant fiber obtained in step (1) in the presence of water.

15. A molding product obtained by curing the molding material of any one of Items 1 to 7.

Hereinafter, the molding material of the present invention and the method for manufacturing the same are explained in detail.

The molding material containing anionically modified microfibrillated plant fibers and a thermosetting resin of the present invention has a feature in that the anionically modified microfibrillated plant fibers are microfibrillated plant fibers that are anionically modified with a carboxylic acid represented by formula (I):

wherein X represents halogen and n is 1 or 2, and/or with a salt thereof, in the presence of a base.

In plant cell walls, a cellulose microfibril (single cellulose nanofiber) having a width of about 4 nm is present as the minimum unit. This is a basic skeleton material (basic element) of plants, and the assembly of such cellulose microfibrils forms a plant skeleton. In the present invention, the "microfibrillated plant fiber(s)" are obtained by breaking apart fibers of a plant-fiber-containing material (e.g., wood pulp) to a nanosize level.

The average diameter of the anionically modified microfibrillated plant fiber of the present invention is generally about 4 to 200 nm, preferably about 4 to 150 nm, and particularly preferably about 4 to 100 nm. The average diameter of the anionically modified microfibrillated plant fiber of the present invention is the average value obtained by measuring at least 50 anionically modified microfibrillated plant fibers in the field of an electron microscope.

The anionically modified microfibrillated plant fiber can be produced, for example, by a method comprising steps (1) and (2) below.

Step (1): Reacting a cellulose fiber with the carboxylic acid represented by formula (I):

X—$(CH_2)_n$—COOH (I), and/or with the salt thereof, in the presence of a base, to anionically modify the cellulose fiber.

Step (2): Defibrating the anionically modified cellulose fiber obtained in step (1) in the presence of water.

Examples of materials containing cellulose fibers (cellulose-fiber-containing materials), which are used as a raw material in step (1), include pulp obtained from a natural cellulose raw material such as wood, bamboo, hemp, jute, kenaf, cotton, beat, agricultural waste, and cloth; mercerized cellulose fiber; and regenerated cellulose fiber such as rayon and cellophane. In particular, pulp is a preferable raw material.

Preferable examples of the pulp include chemical pulp (kraft pulp (KP), sulfite pulp (SP)), semi-chemical pulp (SCP), semi-ground pulp (CGP), chemi-mechanical pulp (CMP), ground pulp (GP), refiner mechanical pulp (RMP), thermomechanical pulp (TMP), and chemi-thermomechanical pulp (CTMP), which are obtained by chemically and/or mechanically pulping plant raw materials; and deinked recycled pulp, cardboard recycled pulp, and magazine recycled pulp, which comprise these plant fibers as main ingredients. These raw materials may optionally be subjected to delignification or bleaching to control the lignin content in the plant fibers.

Among these pulps, various kraft pulps derived from softwood with high fiber strength (softwood unbleached kraft pulp (hereafter sometimes referred to as NUKP), oxygen-prebleached softwood kraft pulp (hereafter sometimes referred to as NOKP), and softwood bleached kraft pulp (hereafter sometimes referred to as NBKP) are particularly preferably used.

The lignin content in the cellulose-fiber-containing material used as a raw material is generally about 0 to 40% by weight, and preferably about 0 to 10% by weight.

The anion modification reaction (reaction of a hydroxyl group in a cellulose-fiber-containing material with the carboxylic acid represented by formula (I):

X—$(CH_2)_n$—COOH (I), and/or with the salt thereof, in the presence of a base) in step (1) can be performed by a known method. The cellulose-fiber-containing material is formed by binding a large number of anhydrous glucose units, and each anhydrous glucose unit contains multiple hydroxyl groups.

By reacting the cellulose-fiber-containing material with the carboxylic acid represented by formula (I) above, and/or with the salt thereof, in the presence of a base, a part of hydroxyl groups of the anhydrous glucose units in the cellulose fiber are reacted with halogen. As a result, it is possible to obtain a cellulose fiber in which a part of hydroxyl groups of the anhydrous glucose units are modified to a group represented by formula (II):

—O—$(CH_2)_n$—COOR (II), wherein R represents an alkali metal.

Specific examples of the carboxylic acid represented by formula (I) above, and/or of the salt thereof, that act on (react with) the cellulose-fiber-containing material, include monochloroacetic acid, 3-chloropropionic acid, sodium monochloroacetate, and sodium 3-chloropropionate. As a base, sodium hydrate is generally used. When monochloroacetic acid and sodium monochloroacetate are used, a cellulose fiber having a carboxymethyl group can be obtained.

The reaction of the cellulose fiber with the carboxylic acid represented by formula (I) above, and/or with the salt thereof, is preferably performed in the presence of water and/or $C_{1-4}$ alcohol (reaction solvent). Examples of the water include tap water, purified water, ion exchange water, pure water, industrial water, and the like. Examples of the $C_{1-4}$ alcohol include methanol, ethanol, n-propyl alcohol, isopropyl alcohol, n-butanol, and the like. Water and $C_{1-4}$ alcohol can be used singly or as a mixture. When water and $C_{1-4}$ alcohol are used as a mixture, the composition ratio is suitably adjusted. However, it is desirable to adjust the degree of substitution by the carboxylic acid represented by formula (I) above, and/or by the salt thereof, to not less than 0.01 to less than 0.4 per anhydrous glucose unit in the obtained anionically modified microfibrillated plant fiber.

In step (1), the cellulose-fiber-containing material acts on (reacts with) the base and the carboxylic acid represented by formula (I) above, and/or the salt thereof, generally at about 50 to 80° C., preferably at about 60 to 80° C., and more preferably at about 70 to 80° C. Additionally, the cellulose-fiber-containing material acts on (reacts with) the carboxylic acid represented by formula (I) above, and/or on the salt thereof, for generally about 10 minutes to 2 hours, preferably 30 minutes to 2 hours, and more preferably about 1 to 2 hours. The pressure for performing step (1) is not particularly limited, and step (1) may be performed under atmospheric pressure.

In step (1), the proportion of the cellulose-fiber-containing material and the carboxylic acid represented by formula (I) above, and/or the salt thereof, may be preferably such that the carboxylic acid and/or the salt thereof is contained in an amount of about 10 to 1,000 parts by weight, more preferably about 10 to 800 parts by weight, and even more preferably about 10 to 300 parts by weight per 100 parts by weight of the cellulose-fiber-containing material.

Further, the proportion of the base is preferably about 1 to 7 parts by weight, more preferably about 1 to 5 parts by weight, and even more preferably about 1 to 3 parts by weight per 100 parts by weight of water used in the reaction.

Furthermore, the proportion of the reaction solvent is preferably about 100 to 50,000 parts by weight, more preferably about 100 to 10,000 parts by weight, and even more preferably about 100 to 500 parts by weight per 100 parts by weight of the cellulose-fiber-containing material.

In the thus-obtained anionically modified cellulose fibers, defibration easily proceeds presumably because the base and the carboxylic acid represented by formula (I), and/or the salt thereof, permeate into the inside of the cellulose, and even the inside of the cellulose-fiber-containing material is sufficiently anionized to increase the effect of electrical repulsion of anionically modified fibers.

The cellulose-fiber-containing material that is anionically modified in step (1) may be subjected to step (2) without further treatment; however, it is preferable that after anion modification in step (1), a component such as a base that remains in the reaction system be neutralized, and then subjected to step (2). Further, in addition to the neutralization step, washing and purification may be performed by a known method. Additionally, the amount of water may be increased or decreased to obtain a fiber concentration appropriate for the subsequent defibration treatment in step (2).

However, in the present invention, the cellulose-fiber-containing material that is anionically modified should not be dried between step (1) and step (2). If the cellulose-fiber-containing material that has been anionically modified in step (1) is dried, it is difficult to obtain a microfibrillated plant fiber that is defibrated to the nano level and has high strength, as in the present invention, even when the dried product is defibrated in subsequent step (2). Since a cellulose molecule has a large number of hydroxyl groups, adjacent fibers of the cellulose-fiber-containing material that has undergone the drying step are bonded to each other by firm hydrogen bonding and are firmly agglomerated (for example, such agglomeration of fibers during drying is called "hornification" in the field of paper and pulp). It is extremely difficult to defibrate fibers once agglomerated using mechanical power. Accordingly, even if a material containing a hornificated cellulose fiber is mechanically broken by using any method, micro-order particles alone are merely formed.

In the present invention, the cellulose-fiber-containing material that is anionically modified in step (1) is defibrated in the presence of water in step (2). A known method can be employed as a method of defibrating the cellulose-fiber-containing material. For example, a defibration method can be used in which an aqueous suspension or slurry of the cellulose-fiber-containing material is mechanically milled or beaten using a refiner, high-pressure homogenizer, grinder, single- or multi-screw kneader, or the like. It is preferable to perform defibration treatment by combining the aforementioned defibration methods, e.g., performing a single- or multi-screw kneader treatment after a refiner treatment, as necessary.

In step (2), the cellulose-fiber-containing material that is anionically modified in step (1) is preferably defibrated by using a single- or multi-screw kneader (hereinbelow, sometimes simply referred to as a "kneader"). Examples of the kneader (kneading extruder) include a single-screw kneader and a multi-screw kneader having two or more screws. In the present invention, either can be used. The use of a multi-screw kneader is preferable because the dispersibility of the microfibrillated plant fiber can be improved. Among multi-screw kneaders, a twin-screw kneader is preferable because it is readily available.

The lower limit of the screw circumferential speed of the single- or multi-screw kneader is generally about 45 m/min. The lower limit of the screw circumferential speed is preferably about 60 m/min., and particularly preferably about 90 m/min. The upper limit of the screw circumferential speed is generally about 200 m/min., preferably about 150 m/min., and particularly preferably about 100 m/min.

The L/D (the ratio of the screw diameter D to the kneader length L) of the kneader used in the present invention is generally from about 15 to 60, and preferably from about 30 to 60.

The defibration time of the single- or multi-screw kneader varies depending on the kind of the cellulose-fiber-containing material, the L/D of the kneader, and the like. When the L/D is in the aforementioned range, the defibration time is generally from about 30 to 60 minutes, and preferably from about 30 to 45 minutes.

The number of defibration treatments (passes) using a kneader varies depending on the fiber diameter and the fiber length of the target microfibrillated plant fiber, the L/D of a kneader, or the like; however, it is generally about 1 to 8 times, and preferably about 1 to 4 times. When the number of defibration treatments (passes) of pulp using a kneader is too large, cellulose becomes discolored or heat-damaged (sheet strength decreased) because heat generation simultaneously occurs, although defibration proceeds further.

The kneader includes one or more kneading members, each having a screw.

When there are two or more kneading members, one or more blocking structures (traps) may be present between the kneading members. In the present invention, since the screw circumferential speed is 45 m/min. or more, which is much higher than the conventional screw circumferential speed, it is preferable not to include the blocking structure to decrease the load to the kneader.

The rotation directions of the two screws that compose a twin-screw kneader are either the same or different. The two screws composing a twin-screw kneader may be complete intermeshing screws, incomplete intermeshing screws, or non-intermeshing screws. In the defibration of the present invention, complete intermeshing screws are preferably used.

The ratio of the screw length to the screw diameter (screw length/screw diameter) may be from about 20 to 150. Examples of the twin-screw kneader include KZW produced by Technovel Ltd., TEX produced by the Japan Steel Works Ltd., TEM produced by Toshiba machine Co. Ltd., ZSK produced by Coperion GmbH, and the like.

The proportion of the raw material pulp subjected to defibration in the mixture of water and the raw material pulp is generally about 10 to 70% by weight, and preferably about 20 to 50% by weight.

The temperature in the defibration is not particularly limited. The defibration can be generally performed at 10 to 100° C., and particularly preferably 20 to 80° C.

As described above, in the present invention, the plant-fiber-containing material that is anionically modified may be subjected to preliminary defibration using a refiner, etc., before being defibrated in step (2). A conventionally known method can be used as a method of preliminary defibration using a refiner, etc. By performing preliminary defibration using a refiner, the load applied to the kneader can be reduced, which is preferable from the viewpoint of production efficiency.

The anionically modified microfibrillated plant fiber of the present invention can be obtained by the aforementioned production method. The lower limit of the degree of substitution by the carboxylic acid represented by formula (I), and/or the salt thereof, per anhydrous glucose unit in the anionically modified microfibrillated plant fibers is preferably about 0.01, more preferably about 0.03, and even more preferably about 0.08. The upper limit of the degree of substitution is about less than 0.4, preferably about 0.3, and more preferably about 0.2. The degree of substitution by the carboxylic acid represented by formula (I) above, and/or by the salt thereof, is the value measured by the method according to the Example.

The lignin content in the anionically modified microfibrillated plant fiber of the present invention is the same as the lignin content of the raw material, i.e., the cellulose-fiber-containing material, and is generally about 0 to 40% by weight, and preferably about 0 to 10% by weight.

To obtain a microfibrillated plant fiber having high strength and a high elastic modulus in the present invention, a cellulose composing the microfibrillated plant fiber preferably includes a cellulose I crystal structure having the highest strength and the highest elastic modulus. The cellulose I crystallinity is generally 60% or more.

The molding material of the present invention can be obtained by further performing, for example, step (3) comprising mixing the anionically modified microfibrillated plant fiber obtained through steps (1) and (2) with a thermosetting resin.

The types of thermosetting resins are not particularly limited as long as the resin can be mixed with the anionically modified microfibrillated plant fiber of the present invention. Examples thereof include phenolic resin, urea resin, melamine resin, unsaturated polyester resin, epoxy resin, diallyl phthalate resin, polyurethane resin, silicone resin, polyimide resin, and the like. These thermosetting resins can be used singly or in a combination of two or more.

The amount of the anionically modified microfibrillated plant fiber contained in the molding material is about 10 to 900 parts by weight, preferably about 10 to 100 parts by weight, and more preferably about 10 to 50 parts by weight, per 100 parts by weight of the thermosetting resin. By adjusting the amount of the anionically modified microfibrillated plant fiber to this numerical range, an effect can be achieved, i.e., a light, high-strength molding material can be obtained.

The molding material can further contain an additive to such an extent that the effects of the present invention are not impaired. Specific examples of additives include surfactant; polysaccharides such as starch and alginic acid; natural proteins such as gelatin, hide glue, and casein; inorganic compounds such as tannin, zeolite, ceramics, and metal powders; colorants; plasticizers; flavors; pigments; fluidity adjusters; leveling agents; conducting agents; antistatic agents; UV absorbers; UV dispersants; deodorants; and the like.

The molding material of the present invention can be obtained by mixing a thermosetting resin, the anionically modified fibrillated plant fiber, and optionally added other components. The mixing method is not particularly limited. An example of such a method is a method comprising impregnating an anionic microfibrillated plant fiber sheet with a liquefied resin. The impregnation method can be suitably selected depending on the form, etc., of the fiber assembly of the fibrillated plant fiber. An example of an impregnation method is a method comprising immersing an anionically modified microfibrillated plant fiber sheet in a liquefied resin. The immersion may be performed under ordinary pressure or reduced pressure.

The method for forming a sheet in a case where an anionically modified microfibrillated plant fiber is used for a thermosetting resin molding material is not particularly limited. For example, a mixed solution (slurry) containing the microfibrillated plant fiber obtained through steps (1) and (2) and water is subjected to suction filtration, and the resulting sheet-like microfibrillated plant fiber on the filter is dried, hot-pressed, etc. The microfibrillated plant fiber can thereby be formed into a sheet form.

The tensile strength of the sheet obtained from the anionically modified microfibrillated plant fiber of the present invention is generally about 60 to 200 MPa, and preferably about 80 to 200 MPa. The tensile strength of the sheet obtained from the anionically modified microfibrillated plant fiber of the present invention sometimes varies depending on the basis weight, density, etc., of the sheet. In the present invention, a sheet having a basis weight of 100 $g/m^2$ is formed, and the tensile strength of the sheet having a density of 0.8 to 1.0 $g/cm^3$ and obtained from the anionically modified microfibrillated plant fiber was measured.

The tensile strength is a value measured by the following method. A dried anionically modified microfibrillated plant fiber sheet that is prepared to have a basis weight of 100 $g/m^2$ is cut to form a rectangular sheet having a size of 10 mm×50 mm to obtain a specimen. The specimen is mounted on a tensile tester, and the stress and strain applied to the specimen are measured while a load is applied. The load applied per specimen unit sectional area when the specimen is ruptured is referred to as "tensile strength."

The tensile elastic modulus of the sheet obtained from the anionically modified microfibrillated plant fiber is generally about 6.0 to 8.0 GPa, and preferably about 7.0 to 8.0 GPa. The tensile elastic modulus of the sheet obtained from the anionically modified microfibrillated plant fiber sometimes varies depending on the basis weight, density, etc., of the sheet. In the present invention, a sheet having a basis weight of 100 $g/m^2$ is formed, and the tensile elastic modulus of the sheet having a density of 0.8 to 1.0 $g/cm^3$ and obtained from the anionically modified microfibrillated plant fiber was measured. The tensile strength is a value measured by the following method.

The molding product of the present invention can be obtained by curing the above-mentioned molding material. The molding material can be cured by any method that is similar to a general method for molding a thermoplastic resin composition. For example, metal molding, injection molding, extrusion molding, blow molding, and foam molding can be employed. The molding product of the present invention is preferably obtained by curing the molding material by hot pressing.

In the molding, molding conditions of resin appropriately adjusted, as required, can be used. When the molding material is in the form of a sheet, for example, a method in which the sheet-like molding material is placed in a mold and cured by hot pressing can be employed. Alternatively, two or more sheet-like molding materials can be overlaid and hot-pressed to thereby obtain one molding product.

The density of the molding product of the present invention varies depending on the types, proportions, etc., of the microfibrillated plant fiber, unsaturated polyester resin, and other materials used; it is generally about 1.1 to 1.4 $g/m^3$.

The molding material of the present invention has high mechanical strength and can therefore be used not only, for example, in fields where known microfibrillated plant fiber molding products and known microfibrillated plant fiber-containing resin molding products are used, but also in fields that require higher mechanical strength (tensile strength, etc.). For example, the molding material of the present invention can be effectively applied to interior materials, exterior materials, and structural materials of transportation vehicles such as automobiles, trains, ships, and airplanes; the housings, structural materials, and internal parts of electrical appliances such as personal computers, televisions, telephones, and watches; the housings, structural materials, and internal parts of mobile communication devices such as mobile phones; the housings, structural materials, and internal parts of devices such as portable music players, video players, printers, copiers, and sporting equipment; building materials; and office supplies such as writing supplies.

Advantageous Effects of Invention

In the present invention, a plant fiber and a carboxylic acid represented by formula (I) and/or a salt thereof are reacted in the presence of a base so as to anionically modify the plant fiber, and the anionically modified plant fiber is defibrated in the presence of water. This allows the starting materials to be easily defibrated, and an extremely thin anionically modified microfibrillated plant fiber can thereby be obtained. For this reason, a sheet obtained from the anionically modified microfibrillated plant fiber can achieve an effect, i.e., achieve particularly excellent tensile strength, and is therefore useful as a reinforcer for a thermosetting resin molding material.

In fact, a molding material comprising a mixture of the anionically modified microfibrillated plant fiber and a thermosetting resin can achieve effects, i.e., achieve excellent flexural modulus and excellent flexural strength.

DESCRIPTION OF EMBODIMENTS

EXAMPLES

Figure 1:
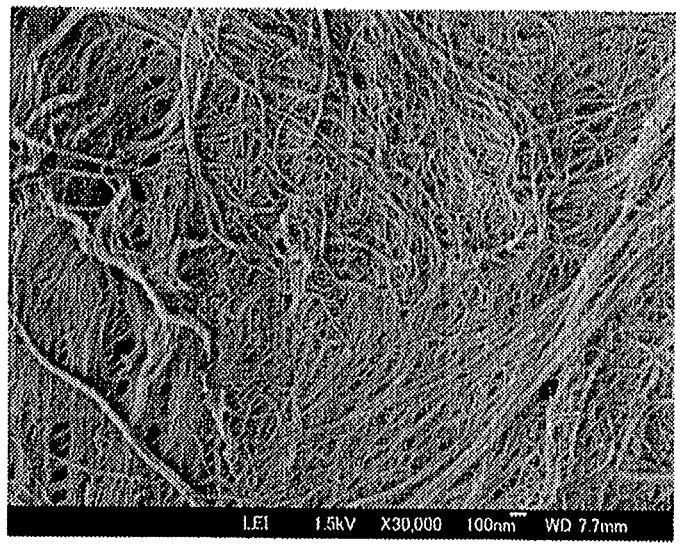
FIG. 1 is an electron microscope photograph of the anionically modified microfibrillated plant fiber obtained in Example 1 (magnification: ×30,000).

The present invention is described in further detail with reference to Examples and Comparative Examples. The scope of the invention is, however, not limited thereto.

Example 1

Preparation of Anionically Modified Pulp

A slurry of softwood bleached kraft pulp (NBKP) (an aqueous suspension with a pulp slurry concentration of 2% by weight) was passed through a single-disk refiner (produced by Kumagai Riki Kogyo Co., Ltd.) and repeatedly subjected to refiner treatment until the Canadian standard freeness (CSF) value of 100 mL or less was achieved. The obtained slurry was dehydrated and concentrated using a centrifugal dehydrator (produced by Kokusan Co., Ltd.) at 2,000 rpm for 15 minutes to a pulp concentration of 25% by weight. Subsequently, 60 parts by dry weight of the above-mentioned pulp, 150 parts by weight of sodium hydroxide, and 2,850 parts by weight of water were introduced into an IKA stirrer whose rotation number had been adjusted to 800 rpm, and the resulting mixture was stirred at 30° C. for 1 hour. Thereafter, 179 parts by weight of monochloroacetic acid on an active component basis was added thereto, and the mixture was stirred for another 30 minutes. Thereafter, the temperature was increased to 70° C., and an etherification reaction was carried out for 1 hour. After cooling, the reaction product was separated, neutralized, washed, and concentrated to thereby obtain an anionically modified pulp having a concentration of 25% by weight. Table 1 shows the degree of anionic substitution (degree of carboxymethylation (DS)) of the anionically modified pulp.

The degree of carboxymethylation was measured by a methanol nitrate method.

Methanol Nitrate Method

About 2.0 g of the anionically modified pulp sample was precisely weighed and introduced into a 300-mL stoppered Erlenmeyer flask. Thereafter, 100 mL of methanol nitrate (liquid obtained by adding 100 mL of reagent grade concentrated nitric acid to 1 L of non-aqueous methanol) was added thereto, and the mixture was shaken for 3 hours to obtain sample A. Then, 1.5 to 2.0 g of absolute dry sample A was precisely weighed and introduced into a 300-mL stoppered Erlenmeyer flask. Sample A was moistened with 15 mL of 80% methanol, 100 mL of 0.1N—NaOH was added thereto, and the mixture was shaken at room temperature for 3 hours. Using phenolphthalein as an indicator, the excess NaOH was back-titrated with 0.1N—$H_2SO_4$. The degree of carboxymethylation was calculated using the following formula:

$$\{100 \times F' - (\text{titer}(mL) \text{ of } 0.1N\text{—}H_2SO_4) \times F \times 0.1\}/A = B$$

Degree of Carboxymethylation (DS)=$0.162 \times B/1 - 0.058 \times B$

A: precisely weighed value (g) of absolute dry sample
B: amount (mL) of 1N—NaOH required to neutralize 1 g of A
F: factor of 0.1N—$H_2SO_4$
F': factor of 0.1N—NaOH Preparation of Anionically Modified Microfibrillated Plant Fiber The obtained anionically modified pulp was introduced into a twin-screw kneader (KZW, produced by Technovel Corporation), and defibration was performed. The defibration was performed using a twin-screw kneader under the following conditions.

Defibration Conditions
  Screw diameter: 15 mm
  Screw rotation speed: 2,000 rpm (screw circumferential speed: 94.2 m/min)
  Defibration time: 150 g of anionically modified pulp was subjected to defibration treatment under the conditions of 500 g/hr to 600 g/hr. The time from introducing the starting material to obtaining microfibrillated plant fibers was 15 minutes.
  L/D: 45
  Number of times defibration treatment was performed: once (1 pass)
  Number of blocking structures: 0

FIG. 1 is an electron microscope photograph of the obtained anionically modified microfibrillated plant fiber. The diameters of 100 arbitrary anionically modified microfibrillated plant fibers shown in the SEM image at 30,000× magnification of FIG. 1 were measured; the number average fiber diameter was 22.56 nm.

Preparation of Anionically Modified Microfibrillated Plant Fiber Sheet

The anionically modified microfibrillated plant fiber slurry obtained above through defibration was filtrated to obtain a wet web of the anionically modified microfibrillated plant fiber. The wet web was hot-pressed at 110° C. under a pressure of 0.003 MPa for 10 minutes, thereby obtaining a bulky sheet of the anionically modified microfibrillated plant fiber. The filtration conditions are as follows:

Filtration area: about 200 cm$^2$
Reduced pressure: –30 kPa,
Filter paper: 5A filter paper, produced by Advantec Toyo Kaisha, Ltd.

Figure 3:
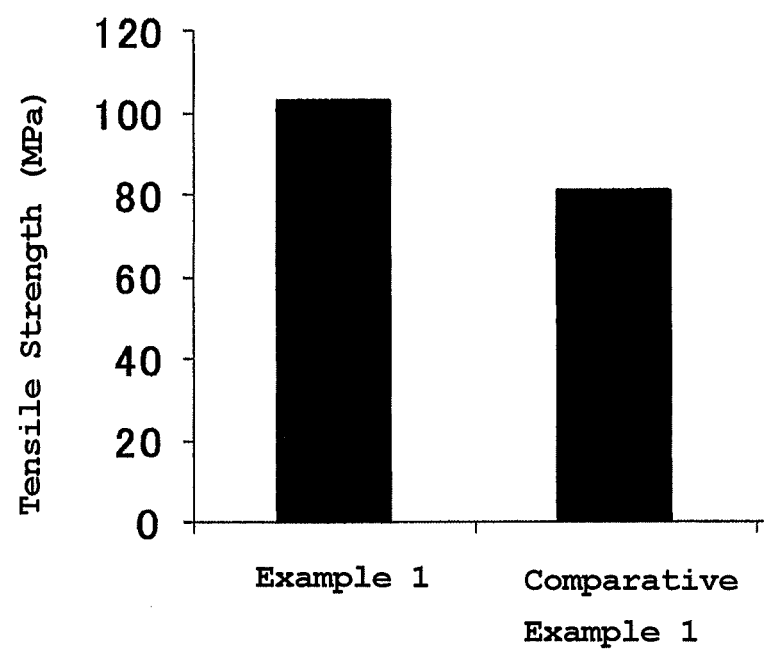
FIG. 3 is a graph showing the results of the tensile strength of the bulky sheets obtained in Example 1 and Comparative Example 1.

The tensile strength of the obtained sheet was measured. The result confirmed that the tensile strength was 103 MPa. FIG. 3 shows the results.

Production of Molding Product of Anionically Modified Microfibrillated Plant Fiber-Unsaturated Polyester Composite The above-described wet web of the anionically modified microfibrillated plant fiber was immersed in an ethanol bath for 1 hour and then hot-pressed at 110° C. under a pressure of 0.003 MPa for 10 minutes, thereby obtaining a bulky sheet. The bulky sheet was cut to a size of 30 mm wide×40 mm long, dried at 105° C. for 1 hour, and the weight was measured. Further, the sheet was immersed in a resin solution prepared by adding 1 part by weight of benzoyl peroxide (Nyper FF, produced by NOF Corporation) to 100 parts by weight of an unsaturated polyester resin (SUNDHOMA FG283, produced by DH Material Inc.). The immersion was performed under reduced pressure (vacuum: 0.01 MPa for 30 minutes) to obtain a sheet impregnated with unsaturated polyester resin. Subsequently, several identical sheets impregnated with unsaturated polyester resin were overlaid so that the molding product had a thickness of about 1 mm. After removing excess resin, the sheets were placed in a mold and hot-pressed (at 90° C. for 30 minutes) to obtain a molding product of an anionically modified microfibrillated plant fiber-unsaturated polyester composite. The weight of the obtained molding product was measured, and the resin content (% by weight) was calculated from the difference between the weight of the molding product and the dry weight of the sheets.

The length and width of the molding product were accurately measured with a caliper (produced by Mitutoyo Corporation). The thickness was measured at several locations using a micrometer (produced by Mitutoyo Corporation), and the volume of the molding product was calculated. The weight of the molding product was measured separately. The density was calculated from the obtained weight and volume.

A sample having a thickness of 1.2 mm, a width of 7 mm, and a length of 40 mm was produced from the molding product, and the flexural modulus and flexural strength of the sample were measured at a deformation rate of 5 mm/min (load cell: 5 kN). An Instron Model 3365 universal testing machine (produced by Instron Japan Co., Ltd.) was used as a measuring device. Table 1 shows the resin content of the obtained resin composite, as well as the flexural modulus and the flexural strength.

Example 2

A bulky sheet of the anionically modified microfibrillated plant fiber was prepared by a method similar to that described in Example 1, except that, in "Preparation of Anionically Modified Pulp," 22 parts by weight of sodium hydroxide, 360 parts by weight of water, and 1,080 parts by weight of 2-propanol (IPA) were used, and 26 parts by weight of monochloroacetic acid on an active component basis was added. Further, using the obtained bulky sheet, a resin composite was produced by a method similar to that described in Example 1. Table 1 shows the resin content of the obtained resin molding material, as well as the flexural modulus and the flexural strength.

Example 3

A bulky sheet of the anionically modified microfibrillated plant fiber was prepared by a method similar to that described in Example 1, except that, in "Preparation of Anionically Modified Pulp," 10.4 parts by weight of sodium hydroxide, 360 parts by weight of water, and 1,080 parts by weight of IPA were used, and 12.5 parts by weight of monochloroacetic acid on an active component basis was added. Further, using the obtained bulky sheet, a resin composite was produced by a method similar to that described in Example 1. Table 1 shows the resin content of the obtained resin molding material, as well as the flexural modulus and the flexural strength.

Comparative Example 1

A microfibrillated plant fiber and a bulky sheet of the microfibrillated plant fiber were prepared by a method similar to that described in Example 1, except that, in "Preparation of Anionically Modified Pulp," anionic modification was not carried out. The tensile strength of the obtained bulky sheet was measured using a method similar to that described in Example 1. As a result, the tensile strength was 81 MPa. FIG. 3 shows the results.

Further, using the obtained bulky sheet, a resin composite was produced by a method similar to that described in Example 1. Table 1 shows the resin content of the obtained resin composite, as well as the flexural modulus and the flexural strength.

Figure 2:
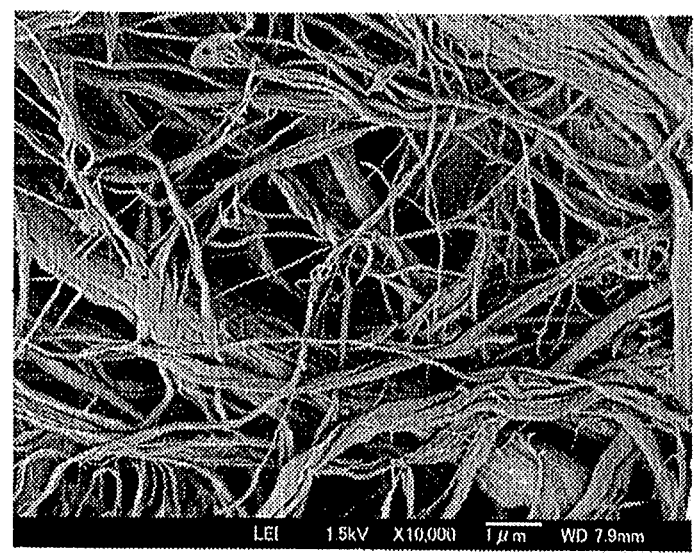
FIG. 2 is an electron microscope photograph of the microfibrillated plant fiber obtained in Comparative Example 1 (magnification: ×10,000).

FIG. 2 shows an electron microscope photograph of the obtained microfibrillated plant fiber. The diameters of 50 arbitrary anionically modified microfibrillated plant fibers shown in the SEM image at 10,000× magnification of FIG. 2 were measured; the number average fiber diameter was 240.0 nm.

Comparative Example 2

A bulky sheet of the anionically modified microfibrillated plant fiber was prepared by a method similar to that described in Comparative Example 1, except that, in "Preparation of Anionically Modified Microfibrillated Plant Fiber," the defibration treatment was performed 4 times (4 passes). Further, using the obtained bulky sheet, a resin composite was produced by a method similar to that described in Example 1. Table 1 shows the resin content of the obtained resin molding material, as well as the flexural modulus and the flexural strength.

TABLE 1

| | Pretreatment | | | | Molding Material | | |
|---|---|---|---|---|---|---|---|
| | Anionization Agent/Proportion (relative to pulp) | Reaction Solvent | DS | Fibrillation method Rotation number | Resin Content (%) | Flexural Modulus (GPa) | Flexural Strength (MPa) |
| Ex. 1 | MCA/340% | Water | 0.05 | Twin-screw kneader (2,000 rpm)/1 pass | 62.1 | 7.1 | 150 |
| Ex. 2 | MCA/43% | Water(3)/ IPA (7) | 0.21 | Twin-screw kneader (2,000 rpm)/1 pass | 64.7 | 5.9 | 160 |
| Ex. 3 | MCA/21% | Water(3)/ IPA (7) | 0.10 | Twin-screw kneader (2,000 rpm)/1 pass | 42.1 | 9.8 | 203 |
| Comp. Ex. 1 | — | | | Twin-screw kneader (2,000 rpm)/1 pass | 69.7 | 5.8 | 134 |
| Comp. Ex. 2 | — | | | Twin-screw kneader (2,000 rpm)/4 passes | 58.3 | 6.6 | 140 |

Consideration

According to the results of Example 1, the anionically modified microfibrillated plant fiber obtained by defibrating the anionically modified pulp using a twin-screw kneader had a tensile strength as high as 108 MPa even when it was in the form of a sheet form. The molding product of the composite of this sheet and unsaturated polyester also had excellent flexural modulus and excellent flexural strength.

Meanwhile, the resin composite of Comparative Example 1 obtained by using a pulp that is not anionically modified had both unsatisfactory flexural modulus and unsatisfactory flexural strength, as compared to Example 1.

As is clear from the microphotographs of the fibers of Example 1 and Comparative Example 1, preparation of an anionically modified pulp causes progress of nanofibrillation to thereby form strong hydrogen bonding between fibers, resulting in increased sheet strength. This is considered to be a reason that excellent flexural modulus and excellent flexural strength can be achieved also in the molding product of the composite of the sheet and unsaturated polyester.

The invention claimed is:

1. A method for manufacturing a molding material comprising anionically modified microfibrillated plant fibers and a thermosetting resin, comprising the steps of:
   (1) reacting plant fibers with a carboxylic acid represented by formula (I):

X—(CH2)n—COOH  (I)

wherein X represents halogen and n is 1 or 2, and/or with a salt thereof, in the presence of a base, to anionically modify the plant fibers,
   (2) defibrating the anionically modified plant fibers obtained in step (1) in the presence of water, and
   (3) mixing the anionically modified microfibrillated plant fibers obtained in step (2) with a thermosetting resin,
   wherein the anionically modified cellulose-fiber-containing material is not dried between steps (1) and (2), and
   wherein the microfibrillated plant fibers comprise 60% or more of a cellulose I crystal structure, and
   wherein the thermosetting resin is an unsaturated polyester resin, and
   a degree of substitution by the carboxylic acid represented by formula (I) and/or by the salt thereof, is not less than 0.01 to less than 0.3 per anhydrous glucose unit in the anionically modified microfibrillated plant fibers
   the molding material comprises the anionically modified microfibrillated plant fibers in an amount of 10 to 900 parts by weight per 100 parts by weight of the thermosetting resin, and
   in step (2), the anionically modified plant fiber is defibrated by using a single- or multi-screw kneader where the lower limit of the screw circumferential speed of the single- or multi-screw kneader is 45 m/min.

2. The method according to claim 1, wherein step (3) is a step in which the anionically modified microfibrillated plant fibers obtained in step (2) are formed into a sheet, and the sheet formed is impregnated with a thermosetting resin.

3. The method according to claim 1, wherein the anionically modified microfibrillated plant fibers are obtained by reacting a part of hydroxyl groups of anhydrous glucose units with a carboxylic acid represented by formula (I):

X—(CH$_2$)$_n$—COOH  (I)

wherein X represents halogen and n is 1 or 2, in the presence of a base, to convert the hydroxyl groups into a group represented by formula (II):

—O—(CH$_2$)$_n$—COOR  (II)

wherein R represents an alkali metal.

4. The method according to claim 1, wherein the anionically modified microfibrillated plant fibers are microfibrillated plant fibers having a carboxyalkyl group.

5. The method according to claim 1, wherein the carboxyalkyl group is a carboxymethyl group.

6. A method for manufacturing a molding product, comprising the step of curing a molding material manufactured by the method of claim 1.

* * * * *